United States Patent [19]

Horowitz

[11] 3,914,155
[45] Oct. 21, 1975

[54] POLYAMIDE/FORMALDEHYDE/EPI- CHLOROHYDRIN WET STRENGTH RESINS AND USE THEREOF IN PRODUCTION OF WET STRENGTH PAPER

[75] Inventor: Frederic Horowitz, Atlanta, Ga.

[73] Assignee: Georgia-Pacific Corporation, Portland, Oreg.

[22] Filed: May 22, 1974

[21] Appl. No.: 472,496

Related U.S. Application Data

[63] Continuation of Ser. No. 287,014, Sept. 7, 1972, abandoned, which is a continuation-in-part of Ser. No. 54,658, July 13, 1970, abandoned.

[52] U.S. Cl............... 162/167; 260/72 R; 260/72 N
[51] Int. Cl.² ..................... C08G 12/04; D21H 3/52
[58] Field of Search......... 260/72 N, 72 R; 162/164, 162/167, DIG. 9

[56] References Cited
UNITED STATES PATENTS

| | | | |
|---|---|---|---|
| 2,430,860 | 11/1947 | Cairns.................................. | 260/72 |
| 2,926,116 | 2/1960 | Keim.................................... | 162/164 |
| 3,227,671 | 1/1966 | Keim.................................... | 260/29.2 |
| 3,372,086 | 3/1968 | Westfall et al...................... | 162/164 |
| 3,594,272 | 7/1971 | Shen et al.......................... | 162/167 |

*Primary Examiner*—S. Leon Bashore
*Assistant Examiner*—William F. Smith

[57] ABSTRACT

A polyalkylene polyamine and a dicarboxylic acid are reacted to provide a polyamide containing secondary amine groups, the polyamide is then reacted with formaldehyde to provide a polyamide having tertiary amine groups containing a —CH$_2$OH substituent and the polymer thereafter reacted with epichlorohydrin. The resins are characterized by good wet strength properties when applied to paper.

10 Claims, No Drawings

POLYAMIDE/FORMALDEHYDE/EPICHLOROHYDRIN WET STRENGTH RESINS AND USE THEREOF IN PRODUCTION OF WET STRENGTH PAPER

RELATED APPLICATIONS

This application is a continuation of application Ser. No. 287,014, filed Sept. 7, 1972 now abandoned; which is a continuation-in-part of application Ser. No. 54,658 filed July 13, 1970 now abandoned.

DESCRIPTION OF THE INVENTION

This invention relates to wet strength resins and more particularly to thermosetting polyamidol-epichlorohydrin resins that impart good wet strength properties to paper.

A variety of polyamide-epichlorohydrin reaction products have been described for use as wet strength resins. Such reaction products are described, inter alia, in U.S. Pat. Nos. 2,926,116, 2,926,154, 3,197,427, 3,244,990, 3,227,671, 3,332,901, 3,239,491, 3,344,122, and 3,352,833. Of the wide variety of polyamide-epichlorohydrin resins disclosed, certain of these, containing polyamides formed by the reaction of a polyalkylene polyamine with a dicarboxylic acid, have achieved commercial success. The search for resins having improved properties, however, continues.

It is one object of the present invention to provide a wet strength resin having good wet strength properties.

It is a further object of the present invention to provide a wet strength resin characterized by the ability to impart superior absorbency to paper.

It is an additional object of this invention to provide a wet strength resin that is characterized by good stability during storage.

It is a still further object of this invention to provide a wet strength resins that permits good broke recovery of fibers after soaking.

It is another object of this invention to provide a wet strength resin that can be readily produced.

In accordance with this invention, there is provided a process comprising forming a polyamide having secondary amine groups by reacting a polyalkylene polyamine having two primary amine groups and at least one secondary amine group with a dicarboxylic acid selected from the group consisting of diglycolic acid and $C_3$ to $C_8$ saturated aliphatic dicarboxylic acids in a mole ratio of polyamine:dicarboxylic acid of from about 0.8:1 to about 1.4:1, and reacting said polyamide with formaldehyde in a formaldehyde:secondary amine mole ratio of at least about 0.5:1 to provide a polyamide having tertiary amine groups containing a $-CH_2OH$ substituent and reacting said polyamide having tertiary amine groups with epichlorohydrin in a mole ratio of epichlorohydrin:amine of from about 1:1 to about 2.5:1 to form a water-soluble cationic thermosetting resin.

This invention also embraces the resins produced by the above process, the process of making paper employing these resins and wet strength papers containing such resins in the cured state.

The resins prepared according to the present invention provide good wet strength. When compared to commercial polyamide-epichlorohydrin resin, (diethylene triamine — adipic acid polymer reacted with epichlorohydrin) they provide comparable wet strength but improved absorbency in manufactured paper articles such as toweling, facial tissue and the like. Moreover, the resins of this invention permit fibers to be more readily recovered if the manufacturer decides to rerun a production lot. Merely soaking under mild aqueous conditions for a period of time, permits ready recovery of fibers.

It has been found that the pH of commercial polyamide-epichlorohydrin tends to drift upward during storage with the resultant risk that the resin properties will change. The resins of this invention, however, exhibit a lesser tendency to change the pH. Moreover, the final pH adjustment for storage stability can be accomplished with the resins of this invention employing a mild organic acid such as formic acid which is less corrosive than inorganic acids normally recommended and does not yield any inorganic residue.

The resins of this invention also provide advantages to the resin manufacturer as compared to commercial polyamide-epichlorohydrin resins such as those manufactured from diethylenetriamine, adipic acid and epichlorohydrin. As a threshold matter, formaldehyde is a readily available, inexpensive commodity and constitutes a significant proportion of the resin of this invention (e.g.: about 13 percent. The raw material costs for the resins of this invention therefore are less than the costs of the conventional polyamide-epichlorohydrin resins. In addition, the polyamidol of this invention readily can be reacted with epichlorohydrin at somewhat lower temperatures and the reaction is not characterized by any substantial decrease in pH during the reaction with epichlorohydrin. When the conventional polyamide is reacted with epichlorohydrin the pH drops, apparently because HCl is liberated. The drop in pH can cause the reaction to terminate and therefore the pH of the reaction generally must be controlled by the addition of an alkaline agent. In contrast, the resins of this invention do not exhibit any pronounced change of pH during the reaction with epichlorohydrin and consequently can be reacted to any desired final viscosity without the need to adjust pH.

The first step in the preparation of the cationic resins of this invention entails a conventional reaction of a polyalkylene polyamine with a dicarboxylic acid. The reaction may be carried out under anhydrous conditions or in the presence of water. The reaction may occur at temperatures as low as 60°C but temperatures above about 100°C are generally employed and temperatures up to about 250°C or higher may be used. For processing economy, it is often desirable to mix the reactants at a moderate temperature and permit the temperature to increase as the exothermic reaction occurs.

The polyalkylene polyamines employed in the initial reaction of this invention are polyamines containing two primary amine groups and from one to three secondary amine groups. In the polyamines, the nitrogen atoms are linked together by groups of the formula $-C_nH_{2n}-$ wherein $n$ is a small integer, from 1 to about 4. The polyalkylene polyamines employed in the practice of this invention include diethylenetriamine, triethylene-tetramine, tetraethylenepentamine, dipropylenetriamine, and the like, or mixtures of polyamines.

The dicarboxylic acids employed for the present invention include diglycolic acid and saturated aliphatic dicarboxylic acids containing from about 3 to about 8 carbon atoms such as malonic acid, succinic acid, glutaric acid, and adipic acid. Saturated aliphatic acids containing from about 4 to 6 carbon atoms and diglycolic acid provide the most desirable interval between amide groups and therefore are preferred. Adipic acid is readily available and is particularly preferred.

The dicarboxylic acids and polyamines are employed in approximately stoichiometric proportions so that essentially all primary amine groups of the polyalkylene polyamine are converted to amide groups. Generally, the mole ratio of polyamine to dicarboxylic acid will be from about 0.8:1 to about 1.4:1 and preferably from about 0.9:1 to about 1.2:1. The water of condensation formed during the reaction is removed as it is formed and if desired, the reaction can be conducted under vacuum conditions. The reaction may require 3 hours or more to complete.

The polyamide is then reacted with formaldehyde to provide a polyamide having tertiary amine groups containing a —$CH_2OH$ substituent. The polymer may be referred to as a polyamidol. Reaction with formaldehyde in aqueous solution readily occurs at moderate temperatures of, for example, from about 40°C to about 90°C. Sufficient formaldehyde is employed to provide a formaldehyde:secondary amine mole ratio of at least about 0.5:1 and preferably at least about 0.8:1. The reaction with formaldehyde appears to be nearly quantitative. If desired, all secondary amine groups may be converted to tertiary amine groups.

The polyamidol readily may be reacted with epichlorohydrin in aqueous solution at temperatures from about 40°C to about 100°C with preferred temperatures ranging from about 40°C to about 70°C. The epichlorohydrin:amine mole ratio will range from about 1:1 to about 2.5:1 and preferably from about 1:1 to about 1.5:1. Reaction is carried out to provide a water soluble cationic resin characterized by a viscosity at least about 30 cps for a 10% solids solution at 25°C.

In order to terminate the reaction, the mixture may be cooled to about room temperature and adjusted to the desired solids content. For long storage life, solids contents of about 15 percent or less are preferred. The aqueous solution then is stabilized by adjusting to an acid pH, preferably a pH of from about 3 to about 5 with an acid. Either mineral acids such as hydrochloric acid, sulphuric acid, nitric acid or phosphoric acid, or organic acids such as formic acid and acetic acid may be employed for stabilization. This resin is ideally suited for use as a wet strength resin for paper.

The cationic resins of this invention are particularly useful for the production of papers (including paperboards) such as, for example, toweling, tissue, foodboard, linerboard, corrugating medium and the like. The resins can be used in conjunction with fibers of all kinds including bleached or unbleached pulps made by the sulfite, sulfate or semi-chemical pulping processes, as well as mixtures of such pulps. The resins may be incorporated into the pulp slurry at any desired point at the wet end of the paper machine. Conventionally, the pulp slurry is deposited onto a screen or wire followed by heating and drying. Instead of adding the resin to the pulp slurry, it may be applied to the dried or partially dried web. Incorporation into the pulp slurry, however, is preferred. The resins generally are added to provide from about 0.2 to about 3 percent resin solids based on fiber (dry weight). Preferred usage envisions the use of from about 0.2 to about 1 percent resin solids based on the weight of dry fiber since such practice tends to provide optimum properties at minimum resin usage.

The resins of this invention readily are heat cured during the paper drying operations. The resins may be cured, for example, in only a few minutes (e.g., 5 minutes) at temperatures normally employed in paper making processes, e.g.: about 105°C.

The following examples are included for illustrative purposes only and are not intended to limit the scope of the invention.

EXAMPLE 1

A polyamide was prepared as follows: 1081.5 grams (10.5 moles) of diethylenetriamine were placed in a four-necked resin flask equipped with a mechanical stirrer with a mercury seal, thermometer, condenser, and sampling tube. The amine was heated to 60°C and 1401.6 grams (9.6 moles) of adipic acid were added during 20-minute period with the heat on full in the electrical heating mantle of the resin kettle. By the end of the adipic acid addition, the temperature had reached 156°C. Heating was continued, and within 20 minutes a temperature of 165°C was reached. At this point distillate started to come off the reaction vessel. The reaction mixture was held at 165°C–195°C for 3 more hours, and a total of 358 grams of water (approx. 20 moles) was collected as distillate. The contents of the kettle were cooled to 170°C and addition of water was started with the condenser in reflux position. Water addition, 2,140 grams, was completed in 40 minutes with the kettle temperature dropping to 90°C. Cooling was continued and the resulting polyamide solution had the following physical properties:

| | |
|---|---|
| Solids | 50.5% |
| Specific Gravity | 1.105 |
| Viscosity | H (Gardner-Holdt scale) |
| pH | 10.0 |

Six hundred grams of the above polyamide solution containing 1.5 moles of secondary amine were placed in a 4-neck resin flask and diluted with 1,575 grams of water. A mixture of 60 grams of 50% formaldehyde (1 mole) and 60 grams of water were added quickly. The resulting solution was heated to 50°C and held for 30 minutes until all of the formaldehyde had reacted with the polyamide and no free formaldehyde could be detected in the reaction mixture.

To this polyamide solution 162.5 grams of epichlorohydrin (1.75 moles) were added. The temperature was raised to 90°C and held at 90°C for 2 hours until a Gardner-Holdt viscosity of A was reached. The reaction mixture was cooled to 80°C and held at 80°C for 25 minutes to obtain a Gardner-Holdt viscosity of B. The solution was now cooled quickly to 58°–60°C and a second addition of 162.5 grams of epichlorohydrin (1.75 moles) was made. The solution was maintained at 60°C and within 60 minutes a viscosity of CD was obtained. The reaction was stopped by addition of 1,680 grams of water and cooling to room temperature. For stability, sufficient 10% solution of muriatic acid was added to adjust the pH to 4.8–5.0. The resulting resin solution was characterized by the following physical properties:

| | |
|---|---|
| Solids | 10.8% |
| Specific Gravity | 1.029 |
| Viscosity | B (Gardner-Holdt scale) |
| PH | 4.8–5.0 |

In the above reaction the formaldehyde:secondary amine mole ratio was 0.67:1 and the epichlorohydrin:amine mole ratio was 2.3:1.

EXAMPLE 2

Standard handsheets were made from the resin of Example 1 and a standard towel furnish consisting of 40% bleached Samoa kraft, 40% Puget slush sulfite, and 20% Puget semi-chemical pulp (Permachem) at pHs varying from neutral to about 8. The handsheets were prepared with resin additions of 0.36, 0.60, and 0.96% resins solids based on a bone dry fiber. The handsheets were conditioned for 2½ hours, weighed for basis weight, oven cured for 5 minutes at 105°C and tested for dry and wet tensile. The results are shown in Table 1 below.

Table 1

| Resin Addition | Furnish pH | Dry Tensile Breaking Length, Meters | Wet Tensile Breaking Length, Meters | % Wet Dry |
|---|---|---|---|---|
| 0.36% | 7.2 | 3615 | 410 | 11.3 |
| 0.60% | 7.2 | 4050 | 815 | 20.1 |
| 0.96% | 7.2 | 4125 | 915 | 22.2 |
| 0.60% | 8.1 | 4360 | 870 | 20.0 |

The tensile breaking length was determined by the formula $23,500 \times P/R$, wherein $P$ = average tensile strength (lbs./in) and $R$ = air dry basis weight (lbs./3472 ft² of paper).

EXAMPLE 3

The resin prepared according to Example 1 was evaluated at three pH ranges (4.2–4.5, 6.8–7.0, and 9.0–9.5) for dry and wet bursting strength (mullen) improvement, and compared with a standard, cationic urea-formal-dehyde resin (GP-349) at 27.5% solids.

Handsheets of 50 lbs. basis weight were made using 100% unbleached douglas fir kraft at 530 ml. Canadian Standard Freeness. Resin additions were 0.5% solids based on a bone dry fiber, and stock pH was adjusted using alum or soda ash. The sheets, after couching off the screen, were dried for 15 minutes at 270°F in a circulating air oven, condition overnight at 50% R.H. and 73°F and then tested for dry and wet mullen. The results are shown in Table 2 and show dry and wet burst factors with corrections for basis weight variations.

Table 2

| Resin | % Resin Added | Furnish pH | Dry Burst Factor | Wet Burst Factor | % Wet Dry |
|---|---|---|---|---|---|
| Control | — | 4.2–4.5 | 38.6 | (1) | — |
| Ex. 1 | 0.5 | 4.2–4.5 | 49.5 | 23.5 | 47.5 |
| U-F resin | 0.5 | 4.2–4.5 | 45.5 | 17.8 | 39.1 |
| Control | — | 7.0 | 36.2 | (1) | — |
| Ex. 1 | 0.5 | 7.0 | 47.8 | 15.1 | 31.6 |
| U-F resin | 0.5 | 7.0 | 44.3 | 11.3 | 25.5 |
| Control | — | 9.0–9.5 | 41.8 | (1) | — |
| Ex. 1 | 0.5 | 9.0–9.5 | 50.0 | 20.2 | 40.4 |
| U-F resin | 0.5 | 9.0–9.5 | 44.0 | (1) | — |

(1) Too low to measure

EXAMPLE 4

The process of Example 1 was repeated varying the amounts of formaldehyde (50% solution) and epichlorohydrin used. In each case, the formaldehyde was added to the polyamide at room temperature and was reacted at 50°C until the reaction was complete (generally 20–40 minutes). The epichlorohydrin was reacted in two equal additions. The first addition was reacted at 90°C until viscosity A (Gardner-Holdt) was reached, then the mixture was cooled to 80°C and reacted to viscosity B. The second addition of epichlorohydrin was reacted at 60°C to viscosity CD.

Table 3

| Resin | Mole Ratio HCHO(1) | Mole Ratio Epi(2) | Epi Reaction Time(3) | % Solids | Specific Gr. | Viscosity Gardner-Holdt) | pH |
|---|---|---|---|---|---|---|---|
| A | 0.5 | 2.3 | 135 | 10.9 | 1.040 | AB | 5.0 |
| B | 1.0 | 2.3 | 220 | 11.0 | 1.040 | AB | 4.9 |
| C | 1.5 | 2.3 | 245 | 11.0 | 1.039 | AAB | 4.9 |
| D | 1.0 | 1.8 | 275 | 11.3 | 1.043 | AB | 4.9 |

(1)Formaldehyde:secondary amine mole ratio.
(2)Epichlorohydrin:amine mole ratio.
(3)Minutes.

The final resins were somewhat darker in color having a light brown color. This color did not affect the brightness properties of finished paper.

EXAMPLE 5

Handsheets were prepared as described in Example 3 at a pH of about 7 employing the resins of Example 4 as additives to the fiber slurry and comparative tests were conducted. The results of the tests are shown in Table 4.

Table 4

| Resin | Resin Addition | Wet Burst Factor | % Wet Dry |
|---|---|---|---|
| Control | — | 4.0 max. | 9.8 max. |
| A | 0.3% | 16.5 | 35.2 |
|   | 0.6% | 23.6 | 47.0 |
| B | 0.3% | 15.3 | 33.8 |
|   | 0.6% | 24.1 | 48.7 |
| C | 0.3% | 14.1 | 31.2 |
|   | 0.6% | 22.4 | 45.9 |
| D | 0.3% | 14.2 | 32.8 |
|   | 0.6% | 22.4 | 46.2 |

EXAMPLE 6

A polyamidol was prepared in the following manner: 1,102 grams (10.7 moles) of diethylenetriamine were placed in a flask equipped with a mechanical stirrer with a mercury seal, thermometer, condenser and sampling tube. Addition of 133 grams of water was made and the mixture was heated to 50°C. When this temperature was reached, 1,562 grams (10.7 moles) of adipic acid were slowly added to the resin flask with the heat on full in the electrical heating mantle. The reaction mixture was held at 165°–185°C until the calculated amount of distillate (approximately 488 grams) had been removed. Heat was turned off and the temperature was allowed to drop to about 180°C and the condenser was placed in reflux position. Addition of 2,673 grams of water was made slowly to avoid flooding the condenser. When all the water had been added, the batch was cooled to 90°C. It was further cooled to 80°C and 642 grams (10.7 moles) of 50% formaldehyde were added over a 15 minute period at 80° to 90°C. A strong exotherm was observed. After addition was complete the mixture was again cooled to 35°C or below.

The resultant polyamidol had the following physical properties:

| | |
|---|---|
| Solids | 44.8% |
| Specific Gravity | 1.096 |
| Viscosity | 130 cps |
| pH | 8.6 |

Five hundred sixty-two grams of polyamidol solution were transferred to another four-neck resin flask and 937 grams of water were added. The resin flask was equipped with a stirrer, thermometer, condenser and addition funnel. The solution was heated to 45°C and 119 grams (1.28 moles) of epichlorohydrin were added at 45° to 50°C during a 20 to 30 minute period. The mixture was heated to 65°C within 30 minutes from the end of the epichlorohydrin addition, and held at this temperature until a viscosity of E (Gardner-Holdt) (after about 4 hours), and 1,410 grams of water were added rapidly. The resin was cooled to 30°C and a pH adjustment to 4 was made with 34 grams of 90% formic acid. The resin was further cooled to 25°C. The resin has the following physical properties.

| | |
|---|---|
| Solids | 12.4% |
| Specific Gravity | 1.040 |
| Viscosity | 55 cps |
| pH | 4.0 |

EXAMPLE 7

Standard hand sheets were made with the resin of Example 6 using bleached Kraft pulp (80% hard wood and 20% soft wood) refined to 450 mls. CSF. The hand sheets were prepared with resin addition of 0.5% and 1.0% resin solids based on bone dry fiber weight. The sheets were conditioned overnight at standard TAPPI conditions (73°F — 50% relative humidity), cured for 5 minutes at 105°C (off-machine) and 5 minutes at 150°C (total cure), and tested for dry and wet tensile strength. Results are shown in Table 5 below.

Since modifications of the invention will be apparent to those skilled in the art, it is intended that this invention be limited only by the scope of the appended claims.

I claim:

1. A process for providing a wet strength resin comprising forming a polyamide having secondary amine groups by reacting a polyalkylene polyamine having two primary amine groups and one to three secondary amine groups with a dicarboxylic acid selected from the group consisting of diglycolic acid and $C_3$ to $C_8$ saturated aliphatic dicarboxylic acids in a mole ratio of polyamine: dicarboxylic acid of from about 0.8:1 to about 1.4:1; reacting said polyamide with formaldehyde in a formaldehyde:secondary amine mole ratio of at least about 0.5:1 to provide a polyamide having tertiary amine groups containing a —$CH_2OH$ substituent, reacting said polyamide with epichlorohydrin in a mole ratio of epichlorohydrin: amine of from 1:1 to about 2.5:1 to form a water-soluble cationic thermosetting resin characterized by a viscosity of at least about 30 cps for a 10% solids solution at 25°C.

2. A process according to claim 1 wherein the polyamine:dicarboxylic acid ratio is from about 0.9:1 to about 1.2:1 and the epichlorohydrin:secondary amine mole ratio is from about 1:1 to about 1.5:1.

3. A process according to claim 1 wherein the polyamide is formed by reacting diethylenetriamine and adipic acid.

4. A process according to claim 1 wherein the formaldehyde:secondary amine ratio is at least about 0.8:1.

5. The resin produced according to the process of claim 1.

6. A process for providing a wet strength paper containing cellulosic fibers comprising incorporating into the paper from about 0.2 to about 3 percent, based on the dry weight of the fibers, a resin prepared by forming a polyamide having secondary amine groups by reacting a polyalkylene polyamine having two primary amine groups and one to three secondary amine groups with a dicarboxylic acid selected from the group consisting of diglycolic acid and $C_3$ to $C_8$ saturated aliphatic dicarboxylic acids in a mole ratio of polyamine:dicarboxylic acid of from about 0.8:1 to about 1.4:1, reacting said polyamide with formaldehyde in a formaldehyde:secondary amine mole ratio of at least about 0.5:1 to provide a polyamide having tertiary amine groups containing a —$CH_2OH$ substituent and reacting said polyamide having tertiary amine groups with epichlorohydrin in a mole ratio of epichlorohydrin:amine of about 1:1 to 2.5:1 to form a water-soluble cationic thermosetting resin characterized by a viscosity of at least about 30 cps for a 10% solid solution at 25°C, and subjecting the resin to heat to provide a thermoset resin.

7. The process according to claim 6 wherein the polyamine:dicarboxylic acid mole ratio is from about Table 5

| Resin | Resin Addition | Furnish pH | Cure | Dry Tensile lbs. per inch | Wet Tensile lbs. per inch | % Wet Dry |
|---|---|---|---|---|---|---|
| Ex. 6 | 0.5% | 8.0 | Off Machine | 14.20 | 1.74 | 12.25 |
| Ex. 6 | 0.5% | 8.0 | Total | 15.64 | 2.57 | 16.78 |
| Ex. 6 | 1.0% | 8.0 | Off Machine | 14.52 | 2.05 | 14.16 |
| Ex. 6 | 1.0% | 8.0 | Total | 15.52 | 3.00 | 19.50 |

0.9:1 to about 1.2:1; the epichlorohydrin:secondary amine mole ratio is from about 1:1 to about 1.5:1 and from about 0.2 to about 1% of the resin is added based on the dry weight of the fibers.

8. The process according to claim 7 wherein the formaldehyde:secondary amine ratio is at least about 0.8:1.

9. The process according to claim 6 wherein the resin is incorporated into a fiber slurry and the fibers thereafter are formed into paper.

10. A wet strength paper formed according to the process of claim 6.

* * * * *